May 26, 1953 P. D. MERRILL 2,639,530
FILM HOLDER

Filed June 26, 1951 2 Sheets-Sheet 1

INVENTOR.
PATTERSON D. MERRILL
BY Altsch & Knoblock
ATTORNEYS

Patented May 26, 1953

2,639,530

UNITED STATES PATENT OFFICE 2,639,530

FILM HOLDER

Patterson D. Merrill, South Bend, Ind.

Application June 26, 1951, Serial No. 233,537

7 Claims. (Cl. 40—152)

This invention relates to improvements in film holders, and more particularly to a holder in which color films are retained in protected condition but exposed for use in a projector of the character well known, and by means of which the image upon the film may be projected upon a screen to be viewed.

This invention relates more particularly to a film holder of the type disclosed in my co-pending patent application, Ser. No. 63,700, filed December 6, 1948, upon which Patent No. 2,603,017 was granted July 15, 1952. In the construction illustrated in my co-pending patent application the device is formed in two parts which are interlocked by a snap lock extending continuously around the holder externally of the film retained thereby so the lock forms a dust seal between the two constituent parts of the holder in addition to serving its function as an interlock. The manufacture of a device of such character requires a very high degree of accuracy of the molds in which the parts are molded, and also requires the avoidance of any distortion in the molded parts as they set up in the molding operation. Also, the snap lock between the parts of the holder, in order to have continuous positive engagement as necessary to provide an outer dust seal, depends in part upon the forces exerted by the flexure of the lips or flanges forming the inner dust seals and pressing against the opposite faces of the transparent plates between which the film is confined. Consequently, since the interlock occurs at the outer dust seal, and depends upon forces generated at the inner dust seal, the dust sealing action at the inner end and the outer dust seals is not equalized. Furthermore, the effectiveness of the interlock and the seal at any one point around the perimeter of the holder depends upon a number of factors, such as the construction of the interlocking parts at that point, the occurrence of any distortion of the inner dust sealing flange at that point, as well as the factors of possible variation in the thickness of the film and retaining plate unit which is confined by the holder.

It is the primary object of this invention to provide a film holder which is operative to hold a multi-part film unit and to seal the film against access of dust and dirt thereto, even though the molded parts may be slightly out of true as molded.

A further object is to provide a device of this character having an inner dust seal and an outer dust seal, each extending perimetrally of the holder, and to provide cooperating snap type locking means upon the respective parts of the holder positioned between said sealing means so as to urge both sealing means effectively into sealing position.

A further object is to provide a device of this character in which interlocking means may be provided at spaced localized points only and are not required to extend continuously around the film and the holder.

A further object of the invention is to provide a device of this character which is simple in construction, light in weight, inexpensive, easy to use for the installation of film therein and the removal of a film therefrom, which fully and adequately protects the film for storage purposes against access of dust and dirt thereto, and which is provided with means for effecting registration of the parts automatically as they are applied together to be interlocked.

Other objects will be apparent from the following specification.

Figure 1:
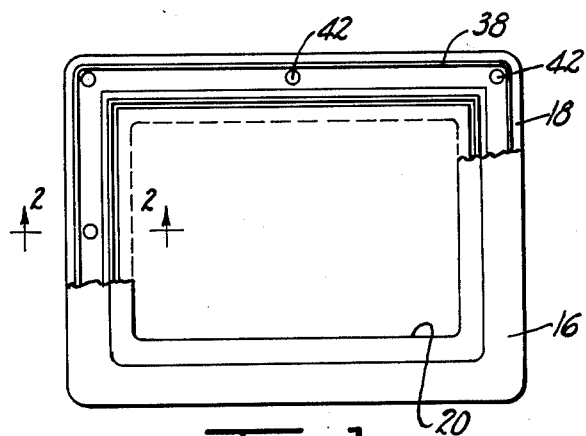
Fig. 1 is a face view of the film holder as viewed from the top in Fig. 3, with the uppermost part of the holder broken away in part.

Two illustrative embodiments of the invention are illustrated in the drawing. That illustrated in Figs. 2 and 3 will be described first.

The numeral 10 designates a film, such as a color transparency, which is to be mounted in the film holder. The numeral 12 designates glass or other transparent flat plates which are positioned on opposite sides of the film 10 in face engagement therewith. The film holder is preferably formed of a synthetic resin, such as cellulose acetate, styrene, vinyl chloride, or the like. It will be understood that the resins enumerated herein are cited as illustrative of the resins which may be employed, and that any other resin found suitable may be used.

The film holder comprises two parts in the nature of rim members which are identified, respectively, by the numerals 16 and 18. Both of these rim members are molded from synthetic resin material and are preferably of rectangular shape, although they may be of any shape or configuration found suitable. The rim parts 16 and 18 are preferably of the same size and shape in outline, and preferably have the same inner perimetral dimension so that a sight opening 20 is provided when the rim parts are assembled together in register, whereby light from a projector (not shown) may pass through the sight opening and the transparent panels and the film to project or throw the image borne by the film upon a viewing screen in a manner well understood in the art.

The rim member 16 has an outer portion with a flat inner face 22 lying in a plane substantially offset from a reduced diameter inner flange portion 24. The inner margin or edge of the outer portion of the part 16 is preferably tapered at 26 and is preferably of a depth greater than the combined thickness of the film 10 and one of the plates 12. The flange portion 24 is of reduced thickness to render the same more flexible than the remaining parts of the rim member 16, but is of sufficient thickness to possess substantial strength and is of a material which possesses resilience so that it tends to spring to its normal shape after any flexing or distortion thereof. The flange portion 24 will preferably be tapered so that it is of less thickness adjacent its inner edge than adjacent the point of its juncture with the outer thick portion of the rim. The outer, comparatively thick portion of the rim is preferably of a thickness which causes it to tend to hold its shape and to resist flexure or bending but which will, nevertheless, accommodate at least limited flexure. The flange portion 24 extends continuous at the inner margin of the rim member 16 and its width is substantially one-half the total width of said member 16. The inner flange portion 24 is of substantially frusto pyramidal form and both its inner and outer surfaces are inclined at a slight angle or otherwise normally deflected toward the plane of the surface 22 of the rim member 16.

Figure 3:
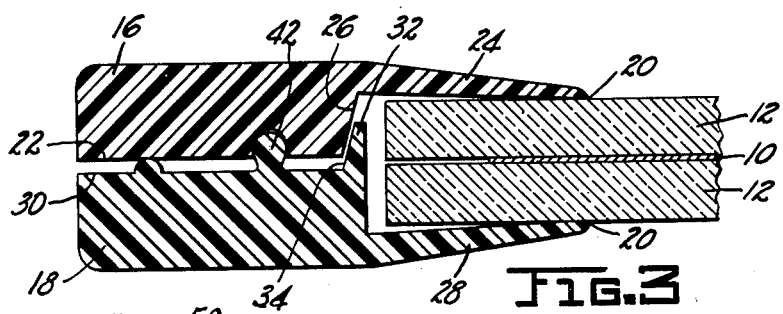
Fig. 3 is an enlarged sectional view similar to Fig. 2 and illustrating the parts in interlocked relation.
Figure 6:
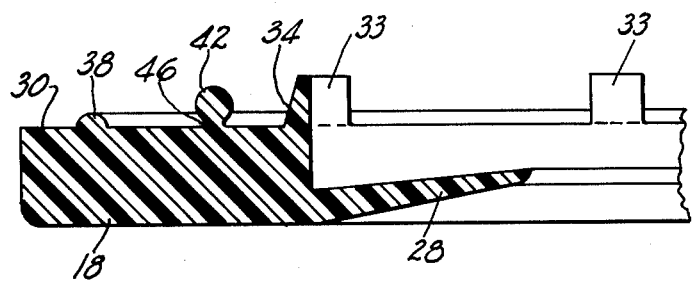
Fig. 6 is an enlarged fragmentary sectional view of another modified embodiment of one holder part.
Figure 7:
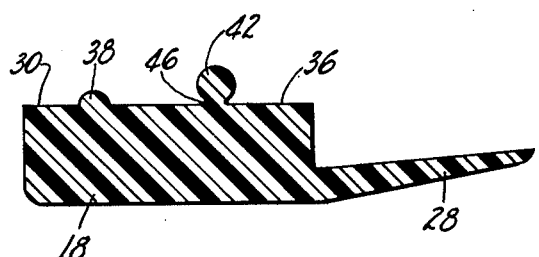
Fig. 7 is an enlarged fragmentary sectional view of still another modified embodiment of one holder part.

The rim member 18 has an outer comparatively thick portion and an inner reduced diameter flange portion 28. The thick part of the rim 18 has a flat inner surface 30 adapted to be positioned adjacent to the surface 22 of the part 16 when the rims are assembled as illustrated in Fig. 3 and the flange 28 is outwardly offset relative to said surface 30. The inner reduced flange portion 28 is similar to the flange portion 24 of the part 16, being of continuous substantially frusto pyramidal form with its inner and outer surfaces extending at an angle to a plane of the surface 30 of the outer part of the rim and possessing the same properties of flexibility and resilience which the flange 24 possesses. The inner edges of the flanges 24 and 28 are of the same shape and register when the holder parts are assembled together. If desired, the rim part 18 may include a pilot or guide flange portion 32 projecting from the face 30 at the inner boundary of the thick outer portion of the rim part 18 and extending continuously therearound. The guide or pilot 32 will preferably include a frusto pyramidal outer surface 34 inclined to substantially mate with and fit telescopically within the surface 26, as illustrated in Fig. 3, when the parts are assembled and interlocked. It will be understood that, while a continuous ringlike guide 32 is preferred, the guide may be interrupted as shown in Fig. 6 at 33 to constitute a plurality of spaced guide elements located at the inner margin of the thickened outer part of the rim 18 to cooperate with and fit within the socket defined by the surface 26 of the member 16. It will also be understood that the guides 32 may be dispensed with completely, so that the surface 30 extends continuously for the full width of the thickened outer part of the rim 18, as at 36 in Fig. 7. The spacing between the surface 30 and the inner face of the flange 28 will preferably be greater than the combined thickness of the film 10 and one of the plates 12.

One of the two rim members 16, 18 is provided adjacent its outer perimeter with a continuous ridge 38 of uniform height and dimension and projecting from the face of that rim which confronts the other rim part. As here illustrated in Figs. 2 and 3, the ridge 38 is formed in the member 18, but it could be applied to the other rim part, as will be obvious.

A plurality of interlocking means are provided. The interlocking means are preferably of the snap lock type and may take any form or character found suitable. The interlocking means are positioned outwardly relative to the inner edges of the flanges 24 and 28 and inwardly relative to the ridge 38. The number of interlocks may vary widely, and their locations also may vary. Sufficient interlocks are provided to hold the rim parts 16 and 18 together securely with the flanges 24 and 28 thereof flexed outwardly from their normal position so they are adapted to apply compressive action. The arrangement of the interlocks illustrated in Fig. 1, wherein an interlock is provided at each corner and other interlocks are provided between the corner interlocks, is preferred, although any lesser number of interlocking means and any other arrangement of the interlocking means which will effectively hold the parts together in sealing relation, as hereinafter described, may be employed and is contemplated to fall within the scope of this invention.

Figure 2:
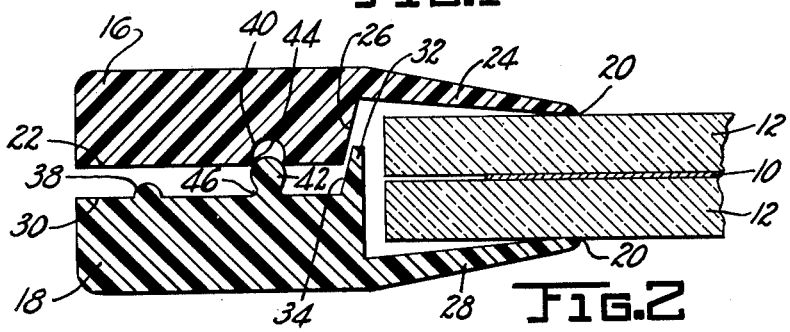
Fig. 2 is an enlarged fragmentary sectional view taken on line 2—2 of Fig. 1 and illustrating the parts of the holder in register preparatory to interlocking thereof.

The specific interlocking means illustrated in Figs. 2 and 3 constitutes a socket 40 formed in one of the rim members, and a pin or stud member 42 formed upon and projecting from the other rim member. Thus, as here illustrated, the socket 40 is formed in the rim 16, and the pin member 42 projects from the member 18. The socket 40 will preferably have a portion 44 at or adjacent to its mouth which is of restricted size or diameter compared to the inner portion thereof, that is, the maximum diameter of the inner part of the socket is greater than the diameter of the reduced portion 44 thereof. The stud 42 has a head part of a diameter slightly greater than the diameter of the mouth 44 and less than the maximum diameter of the socket 40, and the neck 46 of the stud 42 at its point of juncture with the rim part 18 will preferably be of a diameter less than the diameter of the mouth 44.

The parts are so proportioned that they will assume the position and relationship illustrated in Fig. 3 when they are interlocked. Thus the parts are so proportioned that when the interlock is effected, the ridge 38 will continuously engage the cooperating rim part to provide an outer dust seal, and the flanges 24 and 25 will be flexed outwardly from their normal frusto pyramidal form so that their inner edges have continuous dust sealing engagement with the outer surfaces of the transparent plates 12 which they engage, To assemble the parts, they are first positioned as illustrated in Fig. 2 with a film and its face plates 12 engaged by or located between the rim flanges 24 and 28 in inwardly spaced relation to the margins of the plates 12. The plates 12 will preferably be of a size slightly smaller than the size of the recesses in the inner faces of the rim members defined by the reduced flanges and the comparatively thick outer rim parts. The plates and film will normally be inserted in the recess of one of these rim parts, and the other rim part will then be applied thereto, as illustrated in Fig. 2. Where the guides 32 are employed, they project from the inner face of the thick outer rim parts sufficiently to pilot the application of the two rim parts to substantially registering relation. Thus, interlocking parts upon the two rim members will be properly oriented for quick and ready assembly, and all that is required to complete the assembly operation is to press inwardly upon the thick outer parts of the two rims to cause the interlocking parts to interlock, in other words, to cause the heads 42 to snap into the sockets 40.

In the form of the invention illustrated in Figs. 2 and 3, the socket 40 and the head 42 are illustrated as molded integrally with the rim members 16 and 18 adjacent the inner margin of the thickened outer part of each rim. Synthetic resin material is particularly well suited to such a construction, in that it may be distorted without taking a permanent set. Thus the head and socket interlock illustrated will permit repeated interlocking and releasing of the parts without losing its effectiveness. Also, synthetic resin materials of this type have somewhat of a self-lubricating action which substantially resists wear of the parts as the comparatively large head of the pin 42 is forced through the comparatively restricted mouth 44 of the socket 40.

The flanges 24 and 28 are of such shape and construction that they are deflected outwardly from their normal frusto pyramidal shape as the two rim parts are pressed together to form the interlock at 40, 42. Thus they continuously apply a pressure acting in a direction to separate the two rims. It will also be observed that the ridge 38 forms a positive stop to limit the movement of the rims toward each other at their outer margins. This ridge may serve somewhat as a fulcrum tending to press the inner margins at the flanges 24 and 28 toward each other, and this may increase the distortion of the flanges 24 and 28. When the interlock is effected, it is located between this fulcrum at 38 and the inner margins of the flanges 24 and 28 which contact the plates 12. Its locking action applies an inward force upon the two rim parts which is divided so that some of the force is applied at the outer ridge 38, and the remaining force is applied at the inner margins of the flanges 24 and 28. Consequently, since the ridge 38, upon engaging the rim part opposite that which mounts it, defines an outer dust seal which extends continuously around the holder, and since the inner margins of the flanges 24 and 28 constitute inner dust seals, there is an effective and positive and somewhat equalized dust sealing pressure engagement of the parts provided in this structure.

Once the interlocking means have been snapped, the unit is held effectively and the pressure applied by the inner margins to the plates 12 is sufficient to cause those plates to press firmly against the opposite faces of the film 10. Consequently, the film 10, even if substantially smaller than the plates 12, cannot shift out of register with the sight opening 20 and, instead, is firmly clamped in proper or desired register. The interlock holds the parts together and holds the film in this assembled relation indefinitely. The interlock, however, is releasable, and it will be apparent that a space is provided between the cooperating rim parts 16 and 18 extending around the complete perimeter of the holder, which spacing is determined by the thickness or height of the ridge 38. Consequently, it will be apparent that a knife or other member may be inserted between the parts 16 and 18 and then manipulated in a manner to separate said parts and release the interlock so that the film may be removed from the holder.

Figure 4:
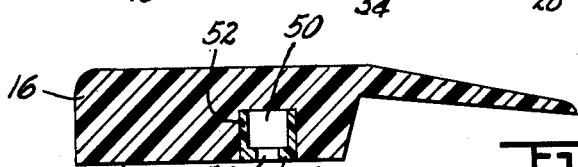
Figs. 4 and 5 are enlarged fragmentary sectional views of cooperating holder parts of a modified embodiment or construction of holder.
Figure 5:
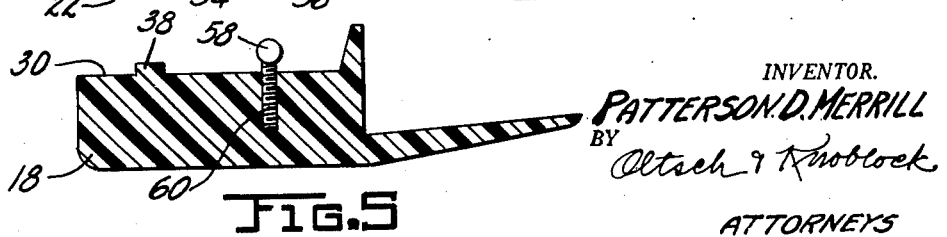

Another embodiment of the invention is illustrated in Figs. 4 and 5. In this embodiment similar parts bear the same reference numerals. The principal difference in this construction, as compared to the construction illustrated in Figs. 2 and 3, is in the nature of the interlocking means and in the omission of the guide means. In this embodiment one of the rim parts, here illustrated as the rim part 16, has a socket 50 formed in the thickened outer part thereof interrupting the inner or confronting surface 22 of that part at a point located inwardly with respect to the outer dust seal ridge 38, here illustrated as formed on the part 18. The socket 50 may be molded, drilled or otherwise formed in the part. A socket 50 may receive a socket member 52 fixedly anchored therein in any manner found suitable, as by cementing the same therein, by inserting the same with a drive fit, or by screw-threading the same. The socket member 50 may be formed either of plastic, metal or any other material. At its outer end flush with the surface 22, the member 52 has a reduced diameter opening 54 defined by an inwardly projecting neck portion 56. The opposite rim member, here illustrated as the member 18, has mounted in register with the socket member 52 and its opening 54, a pin having a head 58 larger than the opening 54 and smaller than the interior of the socket member 52. The head 58 is mounted upon a shank 60 which may be screw-threaded in the plastic part as illustrated, or which may be fixedly anchored or secured in any other manner found suitable, as by having a drive fit or a riveted connection. The member 58 may likewise be formed of metal or plastic. If the parts 52 and 58 are formed of metal, then one or both thereof must be resilient or springy to facilitate interlocking thereof, as is well undestood in the art of snap fasteners. Thus any standard type of snap fastener may be employed, suitably anchored to the device, and in all other respects the holder will be constructed as described above. The operation of this embodiment of the invention will also be the same as the operation described above.

While the preferred embodiments of the invention have been illustrated and described, it will be understood that changes in the construction may be made within the scope of the appended claims without departing from the spirit of the invention.

I claim:

1. A film holder comprising a pair of parts adapted to clamp therebetween a laminar insert including a film and at least one transparent plate in face engagement, said parts having central openings smaller than said insert, each part having a perimetral outer marginal portion and a reduced thickness perimetral inner marginal portion of normal substantially frusto pyramidal form, said inner marginal portion being offset from the innermost face of the outer marginal portion to define an insert-receiving socket, said inner marginal portion tapering laterally inwardly toward the plane of the innermost face of the outer marginal portion, a continuous ridge projecting from the innermost face of the outer marginal portion of one holder part adjacent the outer periphery thereof, and snap lock means for interlocking said holder parts, said means being positioned between and spaced from said inner marginal portion and said ridge and serving to interconnect said holder parts for sealing engagement at said ridge and for sealing flexed engagement of said inner marginal portions with opposite faces of said insert.

2. A film holder comprising a pair of flat members, each member having a central sight opening of a size smaller than a film insert and having a recess in one face thereof adapted to receive said film insert, the inner marginal portion of each member being resilient and of substantially frusto pyramidal form, one of said members having a continuous projection at the outer marginal portion of said recessed face and spaced from said recess, and cooperating means for interlocking the outer marginal portions of said members, said interlock means being located between said projection and said recess and serving to interlock said members with said sight openings in register, with said inner marginal portions in continuous sealing engagement with opposite faces of said film insert and with said projection in continuous sealing engagement with the outer marginal portion of the opposite member.

3. A film holder comprising a pair of flat members, each member having a central sight opening of a size smaller than a film insert and having a recess in one face thereof adapted to receive said film insert, the inner marginal portion of each member being resilient and of substantially frusto pyramidal form, one of said members having a continuous projection at the outer marginal portion of said recessed face and spaced from said recess, and snap lock means for releasably interconnecting said members, said means constituting cooperating male and female parts and being positioned outwardly of said recess and inwardly of said projection.

4. A film holder comprising a pair of flat members, each member having a central sight opening of a size smaller than a film insert and having a recess in one face thereof adapted to receive said film insert, the inner marginal portion of each member being resilient and of substantially frusto pyramidal form, one of said members having a continuous projection at the outer marginal portion of said recessed face and spaced from said recess, and cooperating means for interlocking the outer marginal portions of said members, said interlock means being located between said projection and said recess and serving to interlock said members with said sight openings in register, with said inner marginal portions in continuous sealing engagement with opposite faces of said film insert and with said projection in continuous sealing engagement with the outer marginal portion of the opposite member, said members being molded from a synthetic resin, said interlock means being formed integrally in said members.

5. A film holder comprising a pair of flat rim members molded from synthetic resin material and each having a sight opening, each member having an inner face interrupted by a central film-receiving recess defining a comparatively thin resilient film-engaging flange having at least a portion thereof adjacent its edge deflected into said recess, a plurality of spaced snap locks for releasably interconnecting said members, one of said members having a continuous ridge projecting from its inner face outwardly from said snap locks and having sealed engagement with the other member when said parts are interconnected by said snap locks.

6. A film holder comprising a pair of flat rim members molded from synthetic resin material and each having a sight opening, each member having an inner face interrupted by a central film-receiving recess defining a comparatively thin resilient film-engaging flange having at least a portion thereof adjacent its edge deflected into said recess, a plurality of spaced snap locks for releasably interconnecting said members, one of said members having a continuous ridge projecting from its inner face outwardly from said snap locks and having sealed engagement with the other member when said parts are interconnected by said snap locks, said snap locks each constituting a socket in one member having a restricted portion adjacent to its mouth and a stud projecting from the other member and having a head slightly larger than said restricted socket portion and a neck smaller than said restricted socket portion.

7. A film holder comprising a pair of flat members, each member having a central sight opening of a size smaller than a film insert and having a recess in one face thereof adapted to receive said film insert, the inner marginal portion of each member being resilient and of substantially frusto pyramidal form, one of said members having a continuous projection at the outer marginal portion of said recessed face and spaced from said recess, cooperating means for interlocking the outer marginal portions of said members, said interlock means being located between said projection and said recess and serving to interlock said members with said sight openings in register, with said inner marginal portions in continuous sealing engagement with opposite faces of said film insert and with said projection in continuous sealing engagement with the outer marginal portion of the opposite member, and a flange carried by one member adjacent said recess and extending substantially perpendicularly to the inner marginal portion of said member, said last named flange having a telescopic guiding fit in the recess of the opposite member.

PATTERSON D. MERRILL.

References Cited in the file of this patent

UNITED STATES PATENTS

| Number | Name | Date |
|---|---|---|
| 1,394,675 | Frechette | Oct. 25, 1921 |
| 1,692,999 | Siegel | Nov. 27, 1928 |
| 2,176,283 | Whiteford | Oct. 17, 1939 |
| 2,505,250 | Kime | Apr. 25, 1950 |

FOREIGN PATENTS

| Number | Country | Date |
|---|---|---|
| 897,149 | France | Mar. 13, 1945 |